(12) United States Patent
Tian et al.

(10) Patent No.: US 9,218,771 B2
(45) Date of Patent: Dec. 22, 2015

(54) IMAGE COMPENSATION METHOD FOR SIDE-EMITTING BACKLIGHT AND LCD APPARATUS WITH THE SAME

(75) Inventors: Cuicui Tian, Qingdao (CN); Lili Liu, Qingdao (CN); Wenfeng Xing, Qingdao (CN)

(73) Assignee: Hisense Hiview Tech Co., Ltd, Qingdao (CN)

( * ) Notice: Subject to any disclaimer, the term of this patent is extended or adjusted under 35 U.S.C. 154(b) by 209 days.

(21) Appl. No.: 14/009,935

(22) PCT Filed: May 16, 2012

(86) PCT No.: PCT/CN2012/075568
§ 371 (c)(1),
(2), (4) Date: Nov. 22, 2013

(87) PCT Pub. No.: WO2013/170454
PCT Pub. Date: Nov. 21, 2013

(65) Prior Publication Data
US 2014/0184656 A1 Jul. 3, 2014

(51) Int. Cl.
F21V 8/00 (2006.01)
G09G 3/36 (2006.01)
G09G 3/34 (2006.01)
G02F 1/1335 (2006.01)

(52) U.S. Cl.
CPC ............ G09G 3/3406 (2013.01); G02B 6/0038 (2013.01); G09G 3/36 (2013.01); G02F 1/133615 (2013.01); G09G 2320/062 (2013.01); G09G 2320/0646 (2013.01)

(58) Field of Classification Search
CPC ........... G02F 1/133615; G09G 3/3406; G09G 3/3413; G09G 3/342; G09G 2320/062–2320/0653

USPC .......................................... 362/600, 607, 608
See application file for complete search history.

(56) References Cited

U.S. PATENT DOCUMENTS

2011/0141090 A1 6/2011 Hong et al.
2011/0141155 A1 6/2011 Hong et al.

FOREIGN PATENT DOCUMENTS

| CN | 102097071 | 6/2011 |
| CN | 102098830 | 6/2011 |
| CN | 102402947 | 4/2012 |
| JP | 2010139517 | 6/2010 |

OTHER PUBLICATIONS

International Search Report and Written Opinion for PCT/CN2012/075568.

Primary Examiner — Priyank Shah
Assistant Examiner — Chad Dicke
(74) Attorney, Agent, or Firm — Stites & Harbison PLLC; Richard S. Myers, Jr.

(57) ABSTRACT

The present application provides a an image compensation method for side-emitting backlight comprising steps of: S1, dividing the display screen into several regions; S2, arranging virtual light sources at one side of each region where actual light sources are located for imitating the actual light sources; S3, inputting a pixel value and a coordinate of the point to be compensated; S4, computing a ratio value between an all-full-lighting backlight brightness of the point to be compensated when fully lighted and an all-reduced backlight brightness of the point to be compensated when reduced in brightness; S5, obtaining a compensation factor of the point to be compensated, according to the ratio value; S6, compensating the pixel value of the point to be compensated by using the compensation factor; S7, determining whether all the points to be compensated in the image to be compensated have been compensated or not.

10 Claims, 4 Drawing Sheets

IMAGE COMPENSATION METHOD FOR SIDE-EMITTING BACKLIGHT AND LCD APPARATUS WITH THE SAME

CROSS REFERENCE TO RELATED APPLICATIONS

This application is a §371 National State Application of and claims priority to PCT/CN2012/075568 filed May 16, 2012.

FIELD OF THE INVENTION

The present application relates to LCD, and in particular, to an image compensation method for side-emitting backlight and a LCD apparatus with the same.

BACKGROUND ART

The technology of regional control for backlight involves the backlight brightness adjustment and corresponding pixel compensation according to the image content of the region to be displayed without losing any image brightness, which effectively save the power consumption and increase the contrast ratio. The brightness of LCD backlight may be adjusted by modes of zero-dimension, one-dimension and two-dimension, and the lighting source may be located at direct-emitting type and side-emitting type. The light-adjusting technology in two-dimension mode for light source of direct-emitting type is to divide the screen into several horizontal and vertical regions with independent light-adjustment, which can facilitate image compensation point-by-point upon the light source is reduced in brightness, thus it obtains most attentions of current studies and researches. As a contrary, the backlight of side-emitting type according to the prior art usually cooperates with light-adjustment technology in zero-dimension mode, due to its relatively broader diffusion range (as shown in FIG. 1) which makes the image compensation difficult.

SUMMARY OF THE INVENTION

Therefore, one objective of the present application is to provide an image compensation method for side-emitting backlight and a LCD apparatus with the same which can realize image compensation under dynamic light-adjustment in one-dimension mode for a LCD apparatus with side-emitting backlight.

The present application, on one hand, proposes an image compensation method for side-emitting backlight comprising steps of:

S1, dividing the display screen into several regions parallel with the incident direction of the light from the side-emitting light source;

S2, arranging virtual light sources at one side of each region where actual light sources are located, for imitating the actual light sources;

S3, inputting a pixel value of a point to be compensated in an image to be compensated and a coordinate of the point to be compensated within the surface of the display screen;

S4, computing a ratio value between a backlight brightness of the point to be compensated when all the virtual lights source are fully lighted and a backlight brightness of the point to be compensated when all the virtual light sources are reduced in brightness, according to the coordinate of the point to be compensated and the coordinates of the arranged virtual light sources;

S5, obtaining a compensation factor of the point to be compensated, according to the ratio value;

S6, compensating the pixel value of the point to be compensated by using the compensation factor, to obtain a compensated pixel value of the point to be compensated;

S7, determining whether all the points to be compensated in the image to be compensated have been compensated or not; if so, the compensation of the image to be compensated is completed;

if not, inputting the coordinate and pixel value of the next point to be compensated in the image to be compensated, and returning to S4.

The present application, on the other hand, proposes a LCD apparatus comprising an image compensation module including:

a partitioning unit for dividing the display screen into several regions parallel with the incident direction of the light from the side-emitting light source;

an arranging unit for arranging virtual light sources at one side of each region where actual light sources are located, for imitating the actual light sources;

an inputting unit for inputting a pixel value of a point to be compensated in an image to be compensated and a coordinate of the point to be compensated in the surface of the display screen;

a ratio value computing module for computing a ratio value between a backlight brightness of the point to be compensated when all the virtual lights source are fully lighted, and a backlight brightness of the point to be compensated when all the virtual light sources are reduced in brightness, according to the coordinate of the point to be compensated and the coordinates of the arranged virtual light sources;

a compensation factor computing module for obtaining a compensation factor of the point to be compensated, according to the ratio value; and a compensating module for compensating the pixel value of the point to be compensated by using the compensation factor, to obtain a compensated pixel value of the point to be compensated.

One of the above-mentioned technical solutions is advantageous in that the compensation factor of the point to be compensated according to the present technical solution is obtained by computing the ratio value between a full-lighting backlight brightness and a reduced backlight brightness of the point to be compensated, and in that the compensation factor is then utilized to compensate the point to be compensated, in order to realize image compensation under dynamic light-adjustment in one-dimension mode for a LCD apparatus with side-emitting backlight.

The other one of the above-mentioned technical solutions is advantageous in that an image compensation module is utilized in the LCD apparatus according to the present solution to implement the above-mentioned method for image compensation, which reduces the manufacturing cost of the backlight source, saves the power consumption and increases the contrast ratio.

DETAILED DESCRIPTION OF EMBODIMENTS

Hereinafter the present application will be described in details in combination with the preferred embodiments and the accompanying drawings.

The First Embodiment

The surface brightness of images that is sensed by users through a LCD apparatus is a combined effect of the backlight brightness and the image pixels, thereby the pixel values have to be compensated when the backlight of the LCD apparatus is reduced in brightness, in order to preserve the original surface brightness of images.

Figure 2:
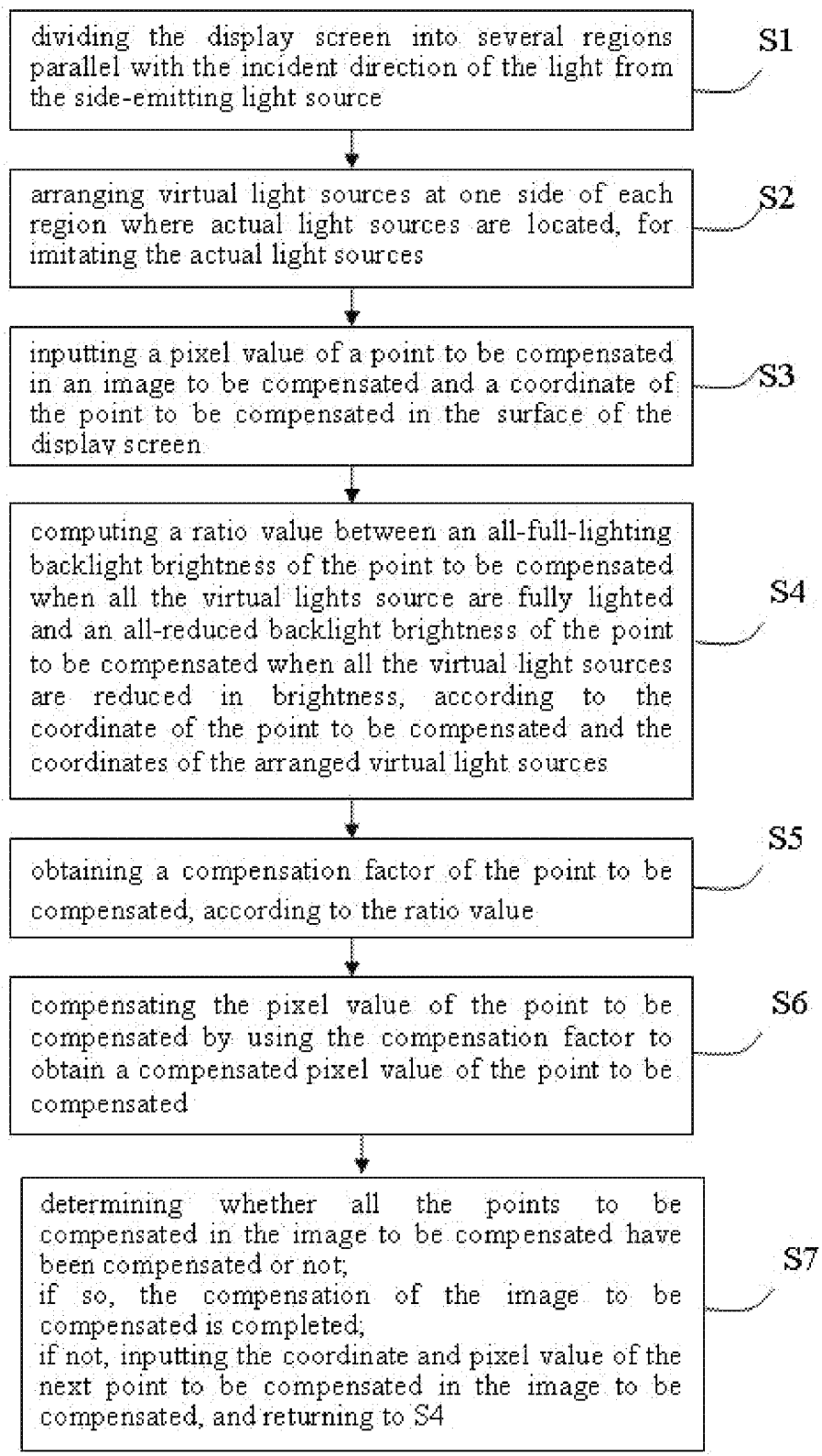
FIG. 2 is an illustrative flow chart of a method for image compensation of the First Embodiment according to the present application.

As shown in FIG. 2, the present embodiment describes a method of image compensation for side-emitting backlight comprising steps of S1-S7, wherein, S1, dividing the display screen into several regions parallel with the incident direction of the light from the side-emitting light source.

S2, arranging virtual light sources at one side of each region where actual light sources are located, for imitating the actual light sources;

for the step S2 in the present embodiment, the virtual light sources are arranged by following ways:

obtaining a boundary of illuminating range of the virtual light sources based on the illuminating ranges of all the actual light sources located at the same side; and arranging the virtual light source according to the boundary of illuminating range.

S3, inputting a pixel value of a point to be compensated in an image to be compensated and a coordinate of the point to be compensated in the surface of the display screen;

S4, computing a ratio value between an all-full-lighting backlight brightness of the point to be compensated when all the virtual lights source are fully lighted and an all-reduced backlight brightness of the point to be compensated when all the virtual light sources are reduced in brightness, according to the coordinate of the point to be compensated and the coordinates of the arranged virtual light sources.

Wherein, all the virtual light sources are reduced in brightness means that the brightness of the virtual light source is reduced below the full-brightness; the brightness of the virtual light source is dependent on the brightness of the actual light source to be imitated such that when the actual light source is fully lighted, the virtual light source is also fully lighted, and that when the actual light source is reduced in brightness (i.e., the actual light source is dimmed), the virtual light source is also dimmed to the same extent accordingly.

Figure 3:
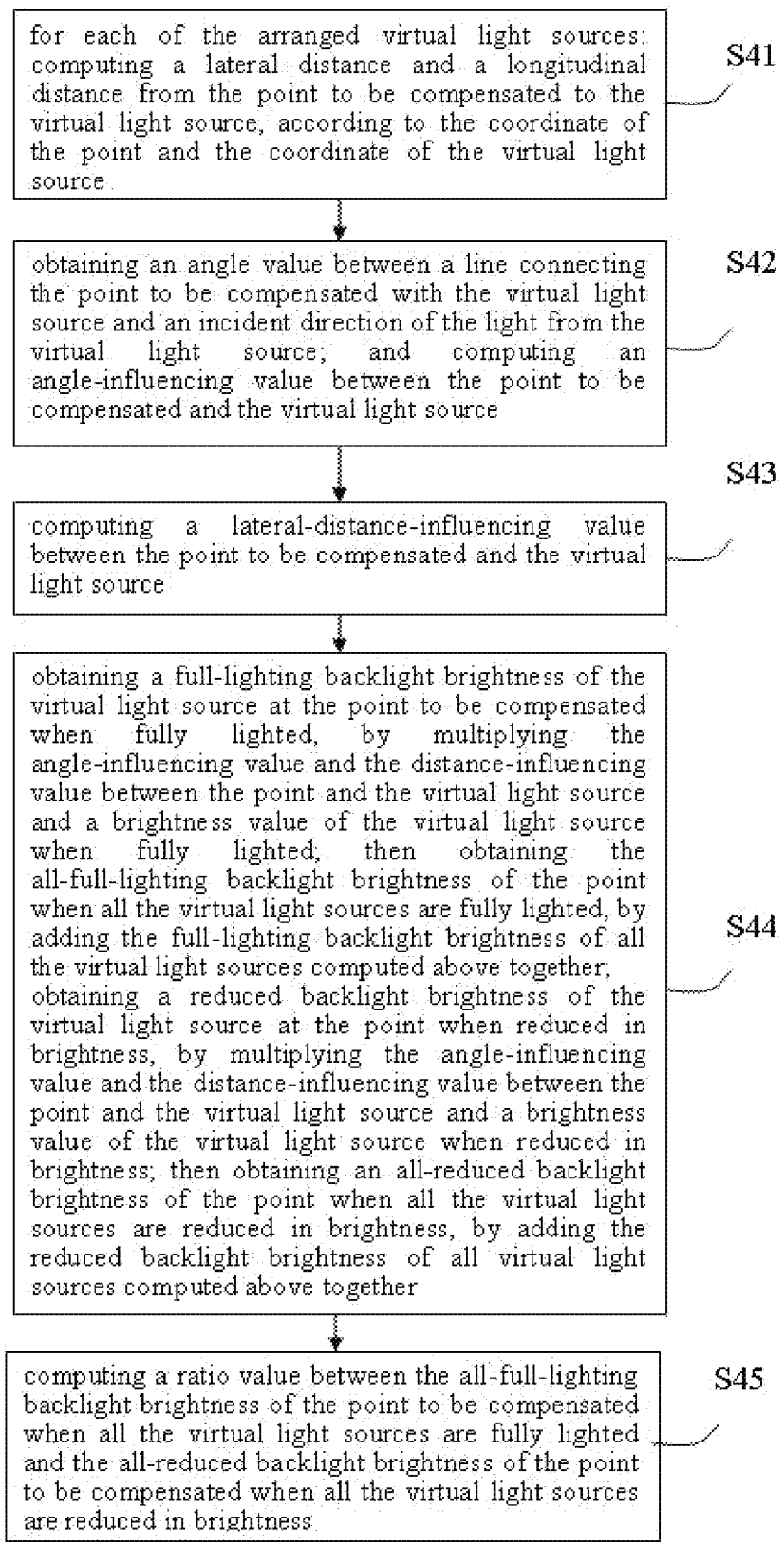
FIG. 3 is the particular procedure of S4 in the method for image compensation of the First Embodiment according to the present application.

As shown in FIG. 3, the step S4 includes:

S41, for each of the arranged virtual light sources: computing a lateral distance and a longitudinal distance from the point to be compensated to the virtual light source, according to the coordinate of the point to be compensated and the coordinate of the virtual light source;

S42, for each of the arranged virtual light sources: obtaining an angle value between a line connecting the point to be compensated with the virtual light source and an incident direction of the light from the virtual light source; and computing an angle-influencing value between the point to be compensated and the virtual light source;

S43, for each of the arranged virtual light sources: computing a lateral-distance-influencing value between the point to be compensated and the virtual light source;

S44, for each of the arranged virtual light sources, obtaining a full-lighting backlight brightness of the virtual light source at the point to be compensated when fully lighted, by multiplying the angle-influencing value between the point to be compensated and the virtual light source, the distance-influencing value between the point to be compensated and the virtual light source, and a brightness value of the virtual light source when fully lighted;

then obtaining the all-full-lighting backlight brightness of the point to be compensated when all the virtual light sources are fully lighted, by adding the full-lighting backlight brightness of all the virtual light sources computed above together; and for each of the arranged virtual light sources, obtaining a reduced backlight brightness of the virtual light source at the point to be compensated when reduced in brightness, by multiplying the angle-influencing value between the point to be compensated and the virtual light source, the distance-influencing value between the point to be compensated and the virtual light source, and a brightness value of the virtual light source when reduced in brightness;

then obtaining an all-reduced backlight brightness of the point to be compensated when all the virtual light sources are reduced in brightness, by adding the reduced backlight brightness of all virtual light sources computed above together;

S45, computing a ratio value between the all-full-lighting backlight brightness of the point to be compensated when all the virtual light sources are fully lighted and the all-reduced backlight brightness of the point to be compensated when all the virtual light sources are reduced in brightness.

S5, obtaining a compensation factor of the point to be compensated, according to the ratio value;

for the step S5 in the present embodiment, the compensation factor is the ratio value to the $\gamma$ power, wherein $\gamma$ is the gamma value of the display panel.

S6, compensating the pixel value of the point to be compensated by using the compensation factor to obtain a compensated pixel value of the point to be compensated;

the step S6 in the present embodiment includes: multiplying the compensation factor by the R value, by the B value and by the G value of the pixel value respectively to obtain three products; comparing the three products with a value of 255 respectively to obtain three smaller ones; and, taking the three smaller ones as the compensated R value, the compensated B value, and the compensated G value of the pixel value of the point to be compensated respectively.

S7, determining whether all the points to be compensated in the image to be compensated have been compensated or not; if so, the compensation of the image to be compensated is completed;

if not, inputting the coordinate and the pixel value of the next point to be compensated in the image to be compensated, and returning to S4.

With the above-mentioned method, the image compensation of a dynamic light-adjustment in one-dimension mode for a LCD apparatus with a backlight of side-emitting type can be realized.

The Second Embodiment

In case that all the side-emitting light sources in the First Embodiment are single-side-emitting ones, the lateral-distance-influencing factor can be removed from both the left and right portions of the equation for computing ratio value, because under such circumstance the lateral distance and thereby the lateral-distance-influencing value between the point to be compensated and the virtual light source will be identical for all the virtual light sources. Therefore, the computation of the lateral-distance-influencing value can be omitted, which speeds up the image compensation.

In the present embodiment, the step S4 includes:

S41', for each of the arranged virtual light sources, computing a lateral (parallel with the incident direction of the light from the light source) distance and a longitudinal (perpendicular to the incident direction of the light from the light source) distance from the point to be compensated to the virtual light source;

S42', for each of the arranged virtual light sources, obtaining a value of an angle between a line connecting the point to be compensated with the virtual light source and an incident direction of the light from the virtual light source; and computing an angle-influencing value between the point to be compensated and the virtual light source, according to the angle value;

S44', for each of the arranged virtual light sources, obtaining a full-lighting backlight brightness of the virtual light source at the point to be compensated when fully lighted by means of multiplying the angle-influencing value between the point to be compensated and the virtual light source by a brightness value of the virtual light source when fully lighted;

then obtaining an all-full-lighting backlight brightness of the point to be compensated when all the virtual light sources are fully lighted, by adding the full-lighting backlight brightness of each virtual light source when fully lighted computed above together; and for each of the arranged virtual light sources, obtaining a reduced backlight brightness of the virtual light source at the point to be compensated when reduced in brightness, by multiplying the angle-influencing value between the point to be compensated and the virtual light source and a brightness value of the virtual light source when reduced in brightness, together;

then obtaining an all-reduced backlight brightness of the point to be compensated when all the virtual light sources are reduced in brightness, by adding the reduced backlight brightness of all virtual light sources when reduced in brightness computed above together;

S45', computing a ratio value between the all-full-lighting backlight brightness of the point to be compensated when all the virtual light sources are fully lighted and the all-reduced backlight brightness of the point to be compensated when all the virtual light sources are reduced in brightness.

The Third Embodiment

In the present embodiment, the steps as follows are performed after S41 and before S42:

for each point to be compensated in the image to be compensated, dividing the horizontal coordinate value of the point by a predetermined value to obtain a quotient and a remainder; assigning the points to be compensated having the same quotient and same vertical coordinate into a same group;

for each group, taking the point to be compensated having a remainder of zero as the first point to be compensated in the group, and performing step S42 thereto; and reusing an angle-influencing value of the first point to be compensated in the group for all the other points to be compensated in the same group and performing step S43 thereto.

In the present embodiment, the predetermined value is the total number of the regions to be divided. In other possible embodiments, the predetermined value may be other suitable numbers depending on demands of computational accuracy.

If the angle-influence value of a point to be compensated has to be computed for all the virtual light sources, the amount of computations will be considerably huge. Considering the difference in angle-influencing value between the points to be compensated whose horizontal coordinate differs within a certain range is very small, the present embodiment reuses the angle-influencing value of the first point to be compensated for all the other points to be compensated in the same group, which facilitates a real-time fluent output for the hardware and speeds up the image compensation.

The Forth Embodiment

In the present embodiment, the method of image compensation, to the exclusion of those described in the First Embodiment, further comprises: establishing a tab including the reciprocals of the lateral distances, the computation functions for angle-influencing values, the computation functions for lateral-distance-influencing values and the computation functions for compensation factors; retrieving the tab and performing linear interpolation, to obtain the reciprocal of the lateral distance, the angle-influencing value, the lateral-distance-influencing value and the compensation factor.

The present embodiment processes the difficult computations of functions by establishing a tab, retrieving the tab and performing linear interpolation, which speeds up the computation.

The Fifth Embodiment

Hereinafter the present application will be described in further details through a particular application example.

S501, dividing the display screen into several regions parallel with the incident direction of the light from the side-emitting light source.

Figure 4:
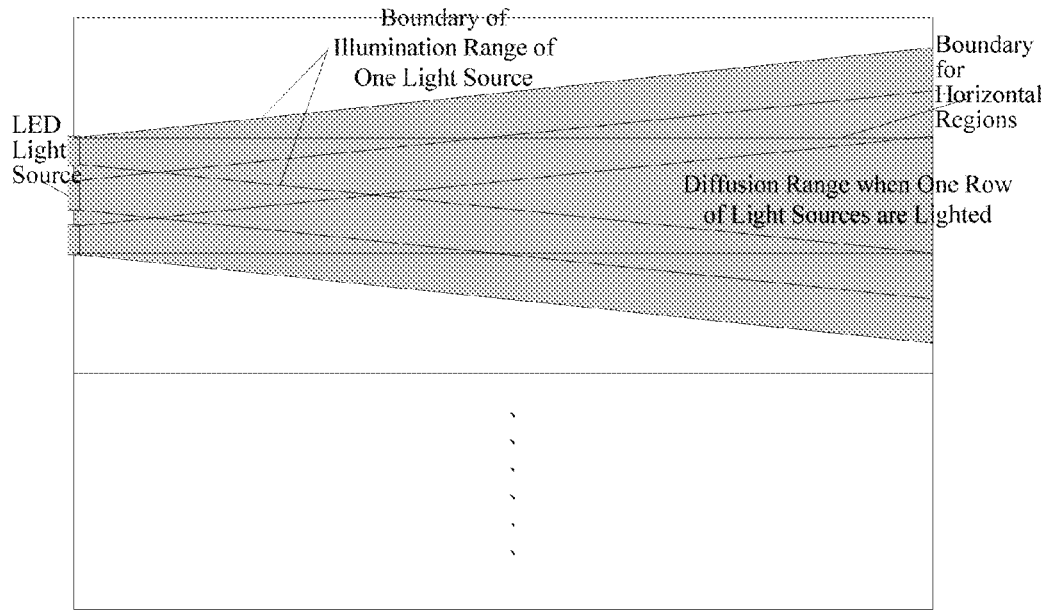
FIG. 4 is a schematic view showing the diffusion of the light from an actual light source of single-side-emitting type according to the Fifth Embodiment.

As shown in FIG. 4, the display screen in the present embodiment is identically divided into several regions; the incident direction of the light from the side-emitting light source is in horizontal, i.e., the regions in the present embodiment is horizontal regions; and the number of the regions (region_num) is six.

Figure 1:
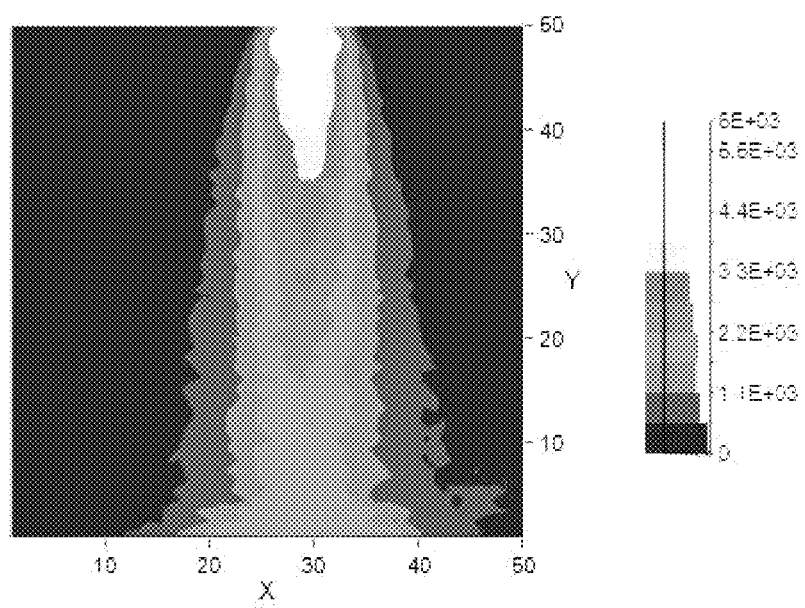
FIG. 1 is a color temperature map of a display apparatus of single-side-emitting type with microstructure, in which one of six regions is lighted.

S502, arranging virtual light sources at one side of each region where actual light sources are located, for imitating the actual light sources;

In step S502 of the present embodiment, the virtual light sources are arranged by following ways:

obtaining a boundary of illuminating ranges of the virtual light sources based on the illuminating ranges of all the actual light sources located at the same side; it can be seen from FIG. 1 that, the light is emitted from the LED light source at an incident angle; the farther from the point to the center of the light source is, the larger the incident angle and thereby the smaller the brightness value is; whereas the closer from the point to the center of the light source is, the smaller the incident angle and thereby the larger the brightness value is. As for the example of backlight of single-side-emitting type shown in FIG. 4, each of the regions is arranged with three actual LED light sources at its left side, wherein the dotted line represents the boundary of the illuminating ranges of the virtual light sources, and the gray area represents the illuminating ranges when all the actual light sources in one of the horizontal regions are lighted.

Figure 5:
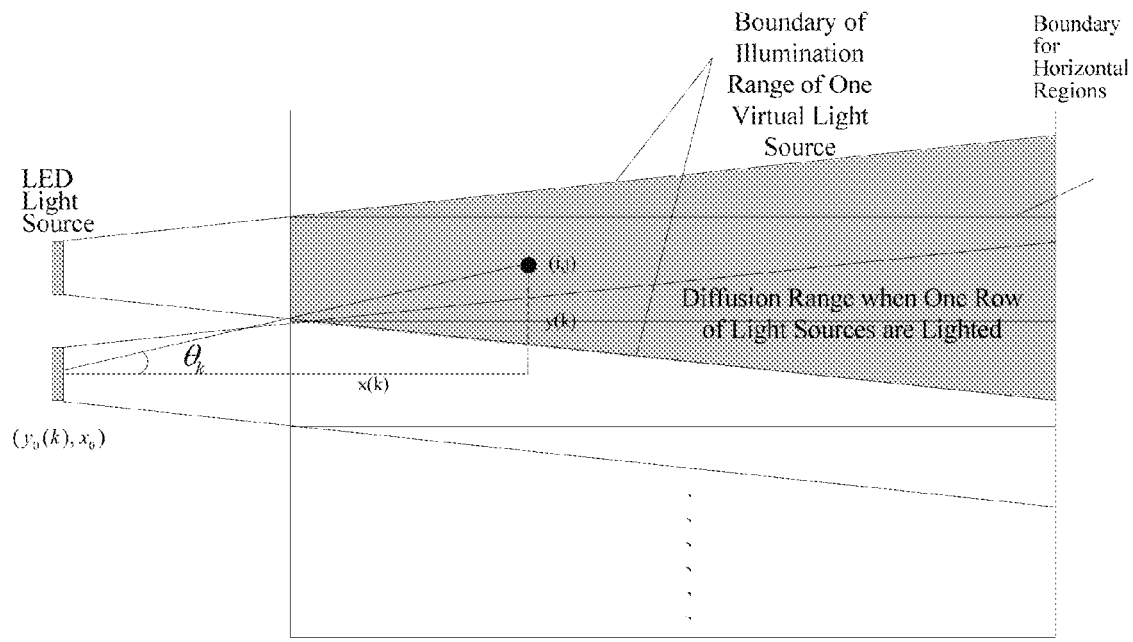
FIG. 5 is a schematic view showing the diffusion of the light from a virtual light source of single-side-emitting type according to the Fifth Embodiment.

The present embodiment only uses a ratio value between an all-full-lighting backlight brightness of the point to be compensated when all the virtual lights source are fully lighted and an all-reduced backlight brightness of the point to be compensated when all the virtual light sources are reduced in brightness, by considering that each point in the image is subjected to the influence of virtual light sources located far way when a horizontal region is lighted. Arranging the virtual light sources according to the boundary of the illuminating ranges, as shown in FIG. 5, wherein $(y_0(k), x_0)$ represents the horizontal and vertical coordinates of the $k^{th}$ virtual light source, and $x_k$, $y_k$ and $\theta_k$ are the lateral distance between the point (i, j) to be compensated to the $k^{th}$ virtual light source, the longitudinal distance between the point (i, j) to be compensated to the $k^{th}$ virtual light source, and the angle between a line connecting the point (i, j) to be compensated with the $k^{th}$ virtual light source and the incident direction of the light, respectively.

S503, inputting the coordinate (i,j) of the point to be compensated in the image to be compensated within the plane of the display screen, as well as the original RBG value $I_{full}$ of the pixel thereof.

Wherein, i is the vertical coordinate (of which the axis is perpendicular to the incident direction of the light) and j is the horizontal coordinate (of which the axis is parallel with the incident direction of the light);

S504, computing a ratio value between an all-full-lighting backlight brightness of the point to be compensated when all the virtual lights source are fully lighted and an all-reduced backlight brightness of the point to be compensated when all the virtual light sources are reduced in brightness, according to the coordinate (i, j) of the point to be compensated and the coordinates of the arranged virtual light sources.

In the present embodiment, the step S504 includes:
S5041, for each of the arranged virtual light sources, computing a lateral distance and a longitudinal distance from the point to be compensated to the virtual light source, according to the coordinate of the point to be compensated and the coordinate of the virtual light source;
S5042, determining whether there is a need of re-computing the sum of the angle-influencing values and the sum of the products of multiplying the angle-influencing value by a backlight coefficient or not.

In particular, dividing the total number of regions (region_num) by horizontal coordinate j to obtain a remainder; if the remainder is 0 (corresponding to the first point to be compensated in the group), it's determined that there is a need of re-computing the sum ($\theta$_sum for single-side-emitting type; $\theta_l$_sum and $\theta_r$_sum for double-side-emitting type) of the angle-influencing values and the sum ($\theta$_bl_sum for single-side-emitting type; $\theta_l$_bl_sum and $\theta_r$_bl_sum for double-side-emitting type) of the product of multiplying the angle-influencing value by a backlight coefficient, and proceeding with S5043; otherwise, reusing the sum of the angle-influencing values and the sum of the product of multiplying the angle-influencing value by a backlight coefficient of the first point to be compensated in the group, and proceeding with S5044.

$$\theta_k = \arctan\left(y_k \times \frac{1}{x_k}\right)$$

each of the arranged virtual light sources: obtaining an angle value between a line connecting the point to be compensated with the virtual light source and an incident direction of the light, according to the lateral distance and the longitudinal distance from the point to be compensated to the virtual light source; and computing an angle-influencing value $f_g(\theta_k)$ between the point to be compensated to the virtual light source.

In the present embodiment, the angle-influencing value is expressed as $$f_\theta(\theta_k) = \frac{1}{1 + \left|\frac{\theta_k}{a}\right|^b},$$

wherein a, b are constants relating to the number of regions and the module structure.

In the present embodiment, the angle value is obtained by retrieving a tab and performing linear interpolation as follows:
Firstly, retrieving a pre-established tab $$LUT_{\frac{1}{x}}(x)$$

by taking the lateral distance $x_k$ as an index, and performing linear interpolation to the retrieving results, to obtain the reciprocal $$\frac{1}{x_k}$$

of the lateral distance $x_k$;
then computing a longitudinal distance $y_k=|i-y_0(k)|$ from the point to be compensated to each virtual light source;
computing a product of multiplying the longitudinal distance by $y_k|i-y_0(k)|$ the reciprocal $$\frac{1}{x_k}$$

of the lateral distance $x_k$, and retrieving a pre-established tab $$LUT_\theta\left(y \times \frac{1}{x}\right)$$

by using the product as an index, then performing linear interpolation to the retrieving results to obtain the angle-influencing value $f_\theta(\theta_k)$.

S5044, for each of the arranged virtual light sources, obtaining a full-lighting backlight brightness of the virtual light source at the point to be compensated when fully lighted, by multiplying the angle-influencing value $f_\theta(\theta_k)$ between the point to be compensated and the virtual light source and a brightness value of the virtual light source when fully lighted together;
then obtaining an all-full-lighting backlight brightness of the point to be compensated when all the virtual light sources are fully lighted, by adding the full-lighting backlight brightness of all virtual light sources computed above together; and for each of the arranged virtual light sources, obtaining a reduced backlight brightness of the virtual light source at the point to be compensated when reduced in brightness, by multiplying the angle-influencing value between the point to be compensated and the virtual light source, the distance-influencing value between the point to be compensated and the virtual light source, and a brightness value of the virtual light source when reduced in brightness together;

then obtaining an all-reduced backlight brightness of the point to be compensated when all the virtual light sources are reduced in brightness, by adding the backlight brightness of all virtual light sources when reduced in brightness computed above together.

In the present embodiment, the backlight brightness of the point (i,j) to be compensated that is resulted from the effects of the virtual light sources can be expressed as:

$$\hat{BL}(i, j) = \sum_{k=1}^{region\_num} (\hat{bl}(k) \times \hat{w}_k(i, j));$$

$$\hat{w}_k(i, j) = f_d(x_k) \times f_\theta(\theta_k);$$

wherein $\hat{bl}(k)$ is the backlight coefficient of the $k^{th}$ light source, and the brightness coefficient $\hat{bl}(k)$ values 1 when all the virtual light sources are fully lighted; $\hat{w}_k(i, j)$ is the influencing factor of the $k^{th}$ virtual light source to the point (i, j); $f_d(x_k)$ is the influencing value of the lateral distance $x_k$; $f_\theta(\theta_k)$ is the influencing value of the angle $\theta_k$. In the present embodiment, the influencing value of the lateral distance $x_k$ can be expressed as $$f_d(x_k) = \frac{1}{x_k^c},$$

which is a monotone decreasing function, similarly with the angle influencing value $f_\theta(\theta_k)$, wherein c is constant relating to the number of regions and to the module structure.

The all-full-lighting backlight brightness $\hat{BL}_{full}(i, j)$ of the point to be compensated when all the virtual light sources are fully lighted can be expressed as:

$$\hat{BL}_{full}(i, j) = \sum_{k=1}^{region\_num} \hat{w}_k(i, j) = \sum_{k=1}^{region\_num} (f_d(x_k) \times f_\theta(\theta_k)).$$

The all-reduced backlight brightness $\hat{BL}_{reduced}(i, j)$ of the point to be compensated when all the virtual light sources are reduced in brightness can be expressed as:

$$\hat{BL}_{reduced}(i, j) = \sum_{k=1}^{region\_num} (\hat{bl}(k) \times \hat{w}_k(i, j))$$

$$= \sum_{k=1}^{region\_num} (\hat{bl}(k) \times (f_d(x_d) \times f_\theta(\theta_k))).$$

S5045, computing a ratio value between the all-full-lighting backlight brightness of the point to be compensated when all the virtual light sources are fully lighted and the all-reduced backlight brightness of the point to be compensated when all the virtual light sources are reduced in brightness, the ratio can be expressed as:

$$\frac{\hat{BL}_{full}(i, j)}{\hat{BL}_{reduced}(i, j)} = \frac{\sum_{k=1}^{region\_num} \hat{w}_k(i, j)}{\sum_{k=1}^{region\_num} (\hat{bl}(k) \times \hat{w}_k(i, j))}$$

$$= \frac{\sum_{k=1}^{region\_num} (f_d(x_k) \times f_\theta(\theta_k))}{\sum_{k=1}^{region\_num} (\hat{bl}(k) \times (f_d(x_k) \times f_\theta(\theta_k)))}.$$

Determining whether the light source is of single-side-emitting type or of double-side-emitting type, and if it's of single-side-emitting type, the lateral distance $x_k$ and thereby $f_d(x_k)$ are identical for all the virtual light sources, thus the above-outlined equation can be reduced to a ratio between a sum $$\theta\_sum = \sum_{k=1}^{region\_num} f_\theta(\theta_k)$$

of the angle-influencing values and a sum $$\theta\_bl\_sum = \sum_{k=1}^{region\_num} (\hat{bl}(k) \times f_\theta(\theta_k))$$

of the products of multiplying the angle-influencing value by a backlight coefficient, that is, $$\frac{\hat{BL}_{full}(i, j)}{\hat{BL}_{reduced}(i, j)} = \frac{\theta\_sum}{\theta\_bl\_sum};$$

if it's of double-side-emitting type (e.g., left and right side-emitting type), the lateral distance $x_k\_l$ of the point (i, j) to be compensated is identical for all the virtual light sources at the left side and can be set as x_l; the lateral distance $x_k\_r$ of the point (i, j) to be compensated is identical for all the virtual light sources at the right side and can be set as x_r. However, x_l≠x_r, because the width of the image is an even number. Since the virtual light sources at the left and right side are symmetrical with respect to the central line of the image, the lateral-distance influencing function $f_d$ to the point (i,j) is identical for the left and right side virtual light sources, that is, $f_d(x\_l) \neq f_d(x\_r)$.

Given that the sum of angle influencing values of the left side is $\theta_l\_sum$, the sum of angle influencing values of the right side is $\theta_r\_sum$, and the sum of products of multiplying the angle influencing value by the backlight coefficient of the right side is $\theta\_bl\_sum$, we have:

$$\theta_l\_sum = \sum_{k=1}^{region\_num} f_\theta(\theta_k\_l),$$

$$\theta_r\_sum = \sum_{k=1}^{region\_num} f_\theta(\theta_k\_r)$$

-continued $$\theta_l\_bl\_sum = \sum_{k=1}^{region\_num} (\hat{bl}(k) \times f_\theta(\theta_k\_l)),$$

$$\theta_r\_bl\_sum = \sum_{k=1}^{region\_num} (\hat{bl}(k) \times f_\theta(\theta_k\_r)).$$

Then the ratio value between the all-full-lighting backlight brightness of the point to be compensated when all the virtual light sources are fully lighted and the all-reduced backlight brightness of the point to be compensated when all the virtual light sources are when reduced in brightness can be expressed as:

$$\frac{\hat{BL}_{full}(i,j)}{\hat{BL}_{reduced}(i,j)} = \frac{f_d(x\_l) \times \theta_l\_sum + f_d(x\_r) \times \theta_r\_sum}{f_d(x\_l) \times \theta_l\_bl\_sum + f_d(x\_r) \times \theta_r\_bl\_sum},$$

in which $f_d(x\_l)$ and $f_d(x\_r)$ cannot be removed as in case of single-side emitting type.

Given that the distance between a virtual light source at left side and a virtual light source at right side is D, we have $f_d(x\_r)=f_d(D-x\_l)$ for $x\_r=D-x\_l$. Then the influencing function $C_d(x\_l)$ related to the distance between the left side and the right side can be expressed as:

$$C_d(x\_l) = \frac{f_d(x\_l)}{f_d(x\_r)} = \frac{f_d(x\_l)}{f_d(D-x\_l)};$$

Then the ratio can be simplified as:

$$\frac{\hat{BL}_{full}(i,j)}{\hat{BL}_{reduced}(i,j)} = \frac{C_d(x\_l) \times \theta_l\_sum + \theta_r\_sum}{C_d(x\_l) \times \theta_l\_bl\_sum + \theta_r\_bl\_sum}.$$

In the present embodiment, the lateral distance x_l is obtained from the difference between a horizontal coordinate j and the horizontal coordinate $x_0$ of the virtual light source at the left side; then the influencing function $C_d(x\_l)$ related to the distance between the left side and the right side is obtained by retrieving a pre-established tab $LUT_d(x\_l)$ and performing a linear interpolation to the retrieving results; and finally the ratio value between the all-full-lighting backlight brightness of the point to be compensated when all the virtual lights source are fully lighted and the all-reduced backlight brightness of the point to be compensated when all the virtual light sources are reduced in brightness can be obtained.

S505, obtaining a compensation factor $f_{com}$ of the point to be compensated, according to the ratio value.

The step S505 in the present embodiment includes: the compensation factor is the ratio value to the γ power, wherein γ is the gamma ray value (generally values 2.2) of the display panel, that is, $$f_{com} = \left(\frac{\hat{BL}_{full}(i,j)}{\hat{BL}_{reduced}(i,j)}\right)^\gamma.$$

In the present embodiment, the value of the compensation factor $$f_{com} = \left(\frac{\hat{BL}_{full}(i,j)}{\hat{BL}_{reduced}(i,j)}\right)^\gamma$$

is obtained by retrieving a pre-established gamma tab $$LUT_\gamma\left(\frac{\hat{BL}_{full}(i,j)}{\hat{BL}_{reduced}(i,j)}\right)$$

using the ratio value $$\frac{\hat{BL}_{full}(i,j)}{\hat{BL}_{reduced}(i,j)}$$

between the all-full-lighting backlight brightness of the point to be compensated when all the virtual lights source are fully lighted and the all-reduced backlight brightness of the point to be compensated when all the virtual light sources are reduced in brightness, and by performing linear interpolation to the retrieving results.

S506, compensating the pixel value of the point to be compensated by using the compensation factor in order to obtain a compensated pixel value of the point to be compensated;

the step S506 in the present embodiment includes: multiplying the compensation factor by the R value, by the B value and by the G value of the pixel value respectively to obtain three products; comparing the three products with a value of 255 respectively to obtain three smaller ones; and taking the three smaller ones as the compensated R value, the compensated B value, and the compensated G value of the compensated pixel value of the point to be compensated, respectively; that is, $I_{reduced}=\min(255, I_{full} \times f_{com})$; wherein $I_{reduced}$ is the compensated value of the pixel and $I_{full}$ is the original RGB value of the pixel.

S507, determining whether all the points to be compensated in the image to be compensated have been compensated or not;

if so, the compensation of the image to be compensated is completed;

if not, inputting the coordinate and the pixel value of the next point to be compensated in the image to be compensated, and returning to S504.

The Sixth Embodiment

The present embodiment describes a LCD apparatus for carrying out the method of image compensation for side-emitting backlight according to the First Embodiment, wherein the LCD apparatus comprises an image compensation module including:

a partitioning unit for dividing the display screen into several regions parallel with the incident direction of the light from the side-emitting light source;

an arranging unit for arranging virtual light sources at one side of each region where actual light sources are located for imitating the actual light sources;

an inputting unit for inputting a pixel value of a point to be compensated in an image to be compensated and a coordinate of the point to be compensated in the surface of the display screen;

a ratio value computing module for computing a ratio value between an all-full-lighting backlight brightness of the point to be compensated when all the virtual lights source are fully lighted and an all-reduced backlight brightness of the point to be compensated when all the virtual light sources are reduced in brightness, according to the coordinate of the point to be compensated and the coordinates of the arranged virtual light sources;

a compensation factor computing module for obtaining a compensation factor of the point to be compensated, according to the ratio value;

a compensating module for compensating the pixel value of the point to be compensated by using the compensation factor to obtain a compensated pixel value of the point to be compensated.

The above-mentioned embodiments of the present application realize image compensation under one-dimension dynamic, light-adjustment for a LCD apparatus with side-emitting backlight, and meanwhile reduce the amount of computation by means of virtual light sources, angle-value reuse, and tab establishment to meet the actual application demands, which reduce the cost of backlight, save the power consumption and increase the contrast ratio.

As above, the preferred embodiments of the present application have been described in details in combination with the accompanying drawings, but the present application is not limited to the particular details in the embodiments mentioned above. Various simple modifications may be made to the technical solutions within the technical conception of the present application, which belong to the protection scope of the present application.

INDUSTRIAL APPLICABILITY

The present application provides an image compensation method for side-emitting backlight and a LCD apparatus with the same to realize dynamic image compensation of light-adjustment in one-dimension mode for a LCD apparatus with side-emitting backlight, and meanwhile reducing the amount of computation by means of virtual light sources, angle-value reuse and tab establishment to meet the actual application demands, which reduce the cost of backlight, save the power consumption and increase the contrast ratio.

What is claimed is:

1. An image compensation method for side-emitting backlight, comprising:
    S1, dividing the display screen into several regions parallel with the incident direction of the light from the side-emitting light source;
    S2, arranging virtual light sources at one side of each region where actual light sources are located for imitating the actual light sources;
    S3, inputting a pixel value of a point to be compensated in an image to be compensated and a coordinate of the point to be compensated in the surface of the display screen;
    S4, computing a ratio value between an all-full-lighting backlight brightness of the point to be compensated when all the virtual lights source are fully lighted and an all-reduced backlight brightness of the point to be compensated when all the virtual light sources are reduced in brightness, according to the coordinate of the point to be compensated and the coordinates of the arranged virtual light sources, wherein the step S4 further includes:
        S41, for each of the arranged virtual light sources, computing a lateral distance and a longitudinal distance from the point to be compensated to the virtual light source, according to the coordinate of the point to be compensated and the coordinate of the virtual light source;
        S42, for each of the arranged virtual light sources, obtaining a value of an angle between a line connecting the point to be compensated with the virtual light source and an incident direction of the light from the virtual light source; and computing an angle-influencing value between the point to be compensated and the virtual light source;
        S43, for each of the arranged virtual light sources, computing a lateral-distance-influencing value between the point to be compensated and the virtual light source;
        S44, for each of the arranged virtual light sources, obtaining a full-lighting backlight brightness of the virtual light source at the point to be compensated when fully lighted, by multiplying the angle-influencing value between the point to be compensated and the virtual light source, the distance-influencing value between the point to be compensated and the virtual light source, and a brightness value of the virtual light source when fully lighted, together;
        then obtaining an all-full-lighting backlight brightness of the point to be compensated when all the virtual light sources are fully lighted, by adding the full-lighting backlight brightness of all virtual light sources when fully lighted computed above together;
    S5, obtaining a compensation factor of the point to be compensated, according to the ratio value;
    S6, compensating the pixel value of the point to be compensated by using the compensation factor to obtain a compensated pixel value of the point to be compensated;
    S7, determining whether all the points to be compensated in the image to be compensated have been compensated or not;
    if so, the compensation of the image to be compensated is completed;
    if not, inputting the coordinate and pixel value of the next point to be compensated in the image to be compensated, and returning to S4.

2. The image compensation method according to claim 1, wherein, for step S2, the virtual light sources are arranged by following ways:
    obtaining a boundary of illuminating ranges of the virtual light sources based on the illuminating ranges of all the actual light sources located at the same side; and
    arranging the virtual light sources according to the boundary of illuminating ranges.

3. The image compensation method according to claim 1, wherein, the step S4 further includes:
    for each of the arranged virtual light sources, obtaining a reduced backlight brightness of the virtual light source at the point to be compensated when reduced in brightness, by multiplying the angle-influencing value between the point to be compensated and the virtual light source, the distance-influencing value between the point to be compensated and the virtual light source, and a brightness value of the virtual light source under dimming, together;
    then obtaining an all-reduced backlight brightness of the point to be compensated when all the virtual light sources are reduced in brightness, by adding the reduced backlight brightness of all virtual light sources when reduced in brightness computed above together;
    S45, computing a ratio value between the all-full-lighting backlight brightness of the point to be compensated when all the virtual light sources are fully lighted and the all-reduced backlight brightness of the point to be compensated when all the virtual light sources are reduced in brightness.

4. The image compensation method according to claim 3, wherein, when the side-emitting backlight is of single-side-emitting type, the S43 can be omitted from S4, and in S44 the full-lighting backlight brightness of the virtual light source at the point to be compensated when fully lighted is expressed as the product of multiplying the angle-influencing value between the point to be compensated and the virtual light source by a brightness value of the virtual light source when fully lighted; the reduced backlight brightness of the virtual light source at the point to be compensated when reduced in brightness can be expressed as the product of multiplying the angle-influencing value between the point to be compensated and the virtual light source by a brightness value of the virtual light source when reduced in brightness.

5. The image compensation method according to claim 3, wherein, the following steps are performed after step S41 and before step S42:
   for each point to be compensated in the image to be compensated, dividing the horizontal coordinate value of the point by a predetermined value to obtain a quotient and a remainder;
   assigning the points to be compensated having the same quotient and same vertical coordinate into a same group;
   for each group, taking the point to be compensated having a remainder of zero as the first point to be compensated in the group and performing step S42 thereto; reusing an angle-influencing value of the first point to be compensated in the group for all the other points to be compensated in the same group and performing step S43 thereto.

6. The image compensation method according to claim 5, wherein, the predetermined value is the total number of the regions to be divided.

7. The image compensation method according to claim 3, wherein, it further comprises:
   establishing a tab including the reciprocals of the lateral distances, the computation functions for angle-influencing values, the computation functions for lateral-distance-influencing values and the computation functions for compensation factors; and
   retrieving the tab and performing linear interpolation to the retrieving results to obtain the reciprocal of the lateral distance, the angle-influencing value, the lateral-distance-influencing value and the compensation factor.

8. The image compensation method according to claim 1, wherein, the step S5 includes: the compensation factor is the ratio value to the y power, wherein y is the gamma value of the display panel.

9. The image compensation method according to claim 1, wherein, the step S6 includes:
   multiplying the compensation factor by the R value, by the B value and by the G value of the pixel value respectively to obtain three products;
   comparing the three products with a value of 255 respectively to obtain three smaller values, and taking the three smaller values as the compensated R value, the compensated B value, and the compensated G value of the pixel value of the point to be compensated, respectively.

10. A LCD apparatus comprising an image compensation module including:
    a partitioning unit for dividing the display screen into several regions parallel with the incident direction of the light from the side-emitting light source;
    an arranging unit for arranging virtual light sources at one side of each region where actual light sources are located for imitating the actual light sources;
    an inputting unit for inputting a pixel value of a point to be compensated in an image to be compensated and a coordinate of the point to be compensated in the surface of the display screen;
    a ratio value computing module for computing a ratio value between an all-full-lighting backlight brightness of the point to be compensated when all the virtual lights source are fully lighted and an all-reduced backlight brightness of the point to be compensated when all the virtual light sources are reduced in brightness, according to the coordinate of the point to be compensated and the coordinates of the arranged virtual light sources;
    wherein the ratio value computing module is further configured for arranging virtual light sources, computing a lateral distance and a longitudinal distance from the point to be compensated to the virtual light source, according to the coordinate of the point to be compensated and the coordinate of the virtual light source;
    for each of the arranged virtual light sources, obtaining a value of an angle between a line connecting the point to be compensated with the virtual light source and an incident direction of the light from the virtual light source; and computing an angle-influencing value between the point to be compensated and the virtual light source;
    for each of the arranged virtual light sources, computing a lateral-distance-influencing value between the point to be compensated and the virtual light source;
    for each of the arranged virtual light sources, obtaining a full-lighting backlight brightness of the virtual light source at the point to be compensated when fully lighted, by multiplying the angle-influencing value between the point to be compensated and the virtual light source, the distance-influencing value between the point to be compensated and the virtual light source, and a brightness value of the virtual light source when fully lighted, together;
    and then obtaining an all-full-lighting backlight brightness of the point to be compensated when all the virtual light sources are fully lighted, by adding the full-lighting backlight brightness of all virtual light sources when fully lighted computed above together;
    a compensation factor computing module for obtaining a compensation factor of the point to be compensated, according to the ratio value;
    a compensating module for compensating the pixel value of the point to be compensated by using the compensation factor, to obtain a compensated pixel value of the point to be compensated.

* * * * *